United States Patent
Varma et al.

(10) Patent No.: US 9,015,415 B2
(45) Date of Patent: Apr. 21, 2015

(54) MULTI-PROCESSOR COMPUTING SYSTEM HAVING FAST PROCESSOR RESPONSE TO CACHE AGENT REQUEST CAPACITY LIMIT WARNING

(75) Inventors: Ankush Varma, Hillsboro, OR (US);
Adrian C. Moga, Portland, OR (US);
Liqun Cheng, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 12/890,434

(22) Filed: Sep. 24, 2010

(65) Prior Publication Data

US 2012/0079186 A1 Mar. 29, 2012

(51) Int. Cl.
*G06F 12/00* (2006.01)
*G06F 12/08* (2006.01)

(52) U.S. Cl.
CPC .......... *G06F 12/0831* (2013.01); *G06F 12/084* (2013.01)

(58) Field of Classification Search
None
See application file for complete search history.

(56) References Cited

U.S. PATENT DOCUMENTS

| | | | |
|---|---|---|---|
| 5,191,652 A * | 3/1993 | Dias et al. | 709/251 |
| 7,644,293 B2 | 1/2010 | Sistla | |
| 7,827,425 B2 | 11/2010 | Hutsell | |
| 2005/0172084 A1 * | 8/2005 | Jeddeloh | 711/154 |
| 2008/0126707 A1 | 5/2008 | Sistla | |
| 2008/0126750 A1 | 5/2008 | Sistla | |
| 2009/0193232 A1 * | 7/2009 | Watanabe | 712/205 |
| 2010/0057998 A1 * | 3/2010 | Moyer et al. | 711/146 |

* cited by examiner

*Primary Examiner* — Matthew Bradley
*Assistant Examiner* — Daniel Tsui
(74) *Attorney, Agent, or Firm* — Blakely, Sokoloff, Taylor & Zafman LLP

(57) ABSTRACT

An apparatus is described that includes a plurality of processors, a plurality of cache slices and respective cache agents. Each of the cache agents have a buffer to store requests from the processors. The apparatus also includes a network between the processors and the cache slices to carry traffic of transactions that invoke the processors and/or said cache agents. The apparatus also includes communication resources between the processors and the cache agents reserved to transport one or more warnings from one or more of the cache agents to the processors that the one or more cache agents' respective buffers have reached a storage capacity threshold.

20 Claims, 4 Drawing Sheets

MULTI-PROCESSOR COMPUTING SYSTEM HAVING FAST PROCESSOR RESPONSE TO CACHE AGENT REQUEST CAPACITY LIMIT WARNING

FIELD OF INVENTION

The field of invention relates generally to computing system design, and, more specifically, to a multi-processor computing system having fast processor response to cache agent request capacity limit warning.

BACKGROUND

A multi-processor computing system is a computing system having multiple processors that execute their own respective software program code. Multi-processor computing systems can be implemented in various ways, such as, with multiple discrete computers interconnected over a wide area network, or, to provide another example, a single computer whose processor chip includes multiple processing cores that independently execute their own respective software code. For simplicity, the present application may use the term "processor" when referring to a component that is technically a "processing core".

Multi-processor computing systems are often implemented with a "shared" cache. A shared cache is capable of receiving information (such as a cache line) from multiple processors within the computing system, and/or, is capable of providing information to multiple processors within the computing system. FIG. 1 shows a component of a multi-processor computing system having each of the following on a single semiconductor chip and/or having each of the following integrated within a single electronic component package 100 (hereinafter, "socket"): 1) multiple processors 101_1 through 101_X; 2) cache "slices" 102_1 through 102_Y (notably, Y may equal X); 3) respective caching agents 103_1 through 103_Y for each of the cache slices; and, 4) a network 104 between the processors and the cache slices. Each of processors 101_1 through 101_X also has its own associated interface 107_1 to 107_X to network 104.

The socket may also include a gateway/router function 105 between the socket's internal network 104, and, another network that is internal to the socket and/or a network that is external to the socket 100 (neither the additional internal network nor the external network are shown in FIG. 1). Notably, a multi-processor computing system may include additional sockets, e.g., designed identically/similar to socket 100, that are interconnected by an external network to increase/scale the processing power of the multi-processor system. The multi-processor computing system may also include other standard computing system components such as a system memory component 109 and associated memory controller and an I/O control hub component (not shown). The multi-processor computing system may also include a hard disk drive or solid state drive. The computing system may also have a display such as a flat panel display coupled to a graphics controller which in turn is coupled to the system memory 109.

Each of processors 101_1 through 101_X may include its own respective, local cache. When a processor looks for an item of information in its local cache and a "miss" occurs (or, if the processors 101_1 through 101_X simply do not include their own respective local cache), one of the cache slices 102_1 through 102_Y is snooped for the desired information. The particular cache slice that is snooped may, for example, be determined from the address of the information (e.g., the address of the desired cache line).

For instance, if a cache miss occurs at processor 101_1, a request is constructed for the desired cache line, and, a hash is performed on the address by the processor's network interface 110_1 to determine which cache slice is the appropriate cache slice for the particular address. The request is then directed over network 104 to the cache agent for the appropriate cache slice (e.g. cache agent 103_1 if cache slice 102_1 is the targeted slice). As part of being formally accepted by the cache agent 103_1, the request is entered into a buffer (a queue may be regarded as a buffer). The cache agent eventually services the request from the buffer snoops the targeted cache slice, and, if the desired cache line for the request is found it is sent over network 104 to processor 101_1. If the desired cache line is not found, a request for the cache line is sent to system memory 109 (the request may be directed over network 104 prior to be directed to system memory 109). The set of cache slices 102_1 through 102_Y are sometimes collectively referred to as the "last level cache" (LLC) because a failed snoop into the LLC causes the desired information to be next sought for outside socket 100 rather than within socket 100.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
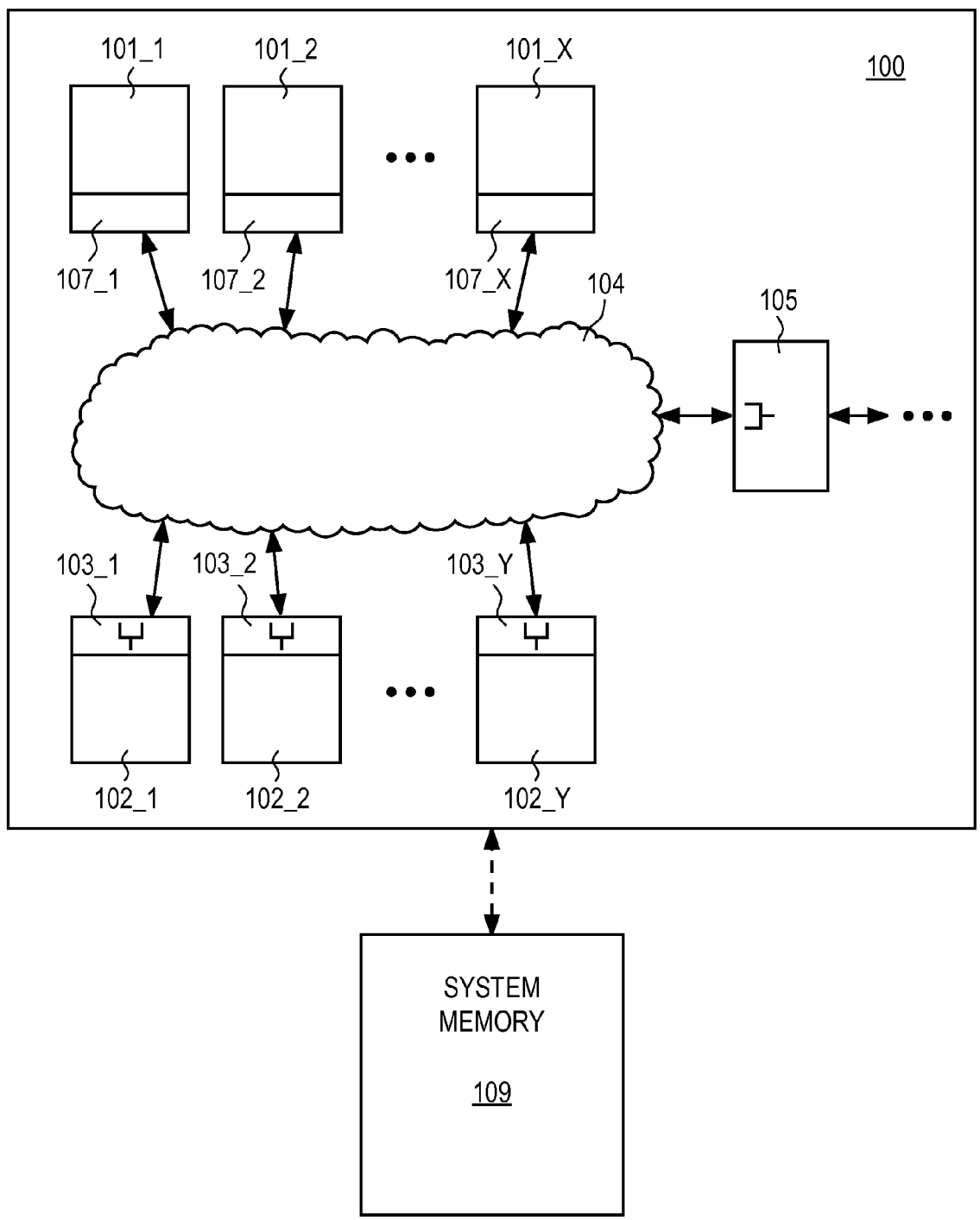
FIG. 1 shows features of a multi-processor computing system.

Continuing with the cache snoop example discussed in the background, it is noteworthy that, in an embodiment, when the request from processor 101_1 is formally accepted by the cache agent 103_1 and entered into the cache agent's buffer, the "transaction" that the request is associated with converts from being "un-credited" to "credited". Here, a transaction can be viewed as a complete process from an initial request to its conclusion (often in the form of a response to the request). For instance, in the case of the cache line request discussed above, the following sequence of events can be viewed as the request's associated transaction: i) the sending of the request from the processing core 101_1 to the cache agent 103_1; ii) the cache snoop by the cache agent 103_1 into cache slice 102_1; iii) the sending of the subsequent request to memory 109 because of the cache snoop miss; and, iv) the sending of a response including the requested cache line from memory 109 to processor 101_1.

According to one approach, the size of the buffers in the cache agents 103_1 to 103_Y are determined in view of the resources of the path that exists between the socket 100 and memory 109. The conversion of a request's transaction from "un-credited" to "credited" with its entry into the cache agent's buffer signifies that there should be enough resources in the system to service the request even if the cache snoop misses and memory 109 has to be invoked. Moreover, once the transaction becomes credited, it becomes higher priority than un-credited traffic. In a sense, the system attempts to regulate its internal traffic flows by committing itself to successfully servicing credited transactions at the expense of un-credited transactions. Contrarily, the rejection of a request at a cache agent buffer because the buffer is full causes the request's transaction to remain un-credited and therefore lower priority.

In an embodiment, the resources of network 104 are partitioned such that, in normal operation, some percentage of the network's resources are available to accept un-credited traffic. This means, for instance, that regardless of the system's internal traffic flows, processors 101_1 through 101_X are generally permitted to issue requests for new, un-credited transactions into the network 104. In some embodiments this partition may be substantial. For instance, in one embodiment, a first percentage of the resources of the network 104 are reserved for traffic of any kind (including credited traffic, un credited traffic and traffic that is not labeled as credited nor labeled as un-credited), and, a second percentage of the resources of the network are reserved for traffic that is labeled as credited or is labeled as un-credited. In a further embodiment, the first percentage is approximately 45% and the second percentage is approximately 45% yielding, under normal conditions, approximately 90% of the resources of network 104 being useable for un-credited traffic.

In some situations an influx of new requests for new un-credited transactions may dramatically (e.g., spontaneously) increase such that overall system performance is hampered. Specifically, the resources of network 104 may suddenly become so overloaded with new requests and associated un-credited traffic that credited transactions cannot be completed or are unacceptably delayed. For example, referring to the previous cache line request example, if network 104 suddenly becomes swamped with un-credited new requests the response from memory 109 may not be able reach processor 101_1 (because the response is blocked attempting to enter network 104). Preventing or delaying the completion of credited transactions essentially corresponds to degradation in system performance.

According to one approach, network 104 is a ring. When a cache agent detects that its buffer is full, time is consumed by the cache agent waiting for the opportunity to send a particular type of message to each of the processors 101_1 through 101_X that a cache agent buffer is at/near full capacity. The total consumed time corresponds to too much delay trying to warning the processors of the potential or existence of an overburdened cache agent, and, can result in additional un-credited traffic being issued into the network 104 exacerbating the problem.

Figure 2:
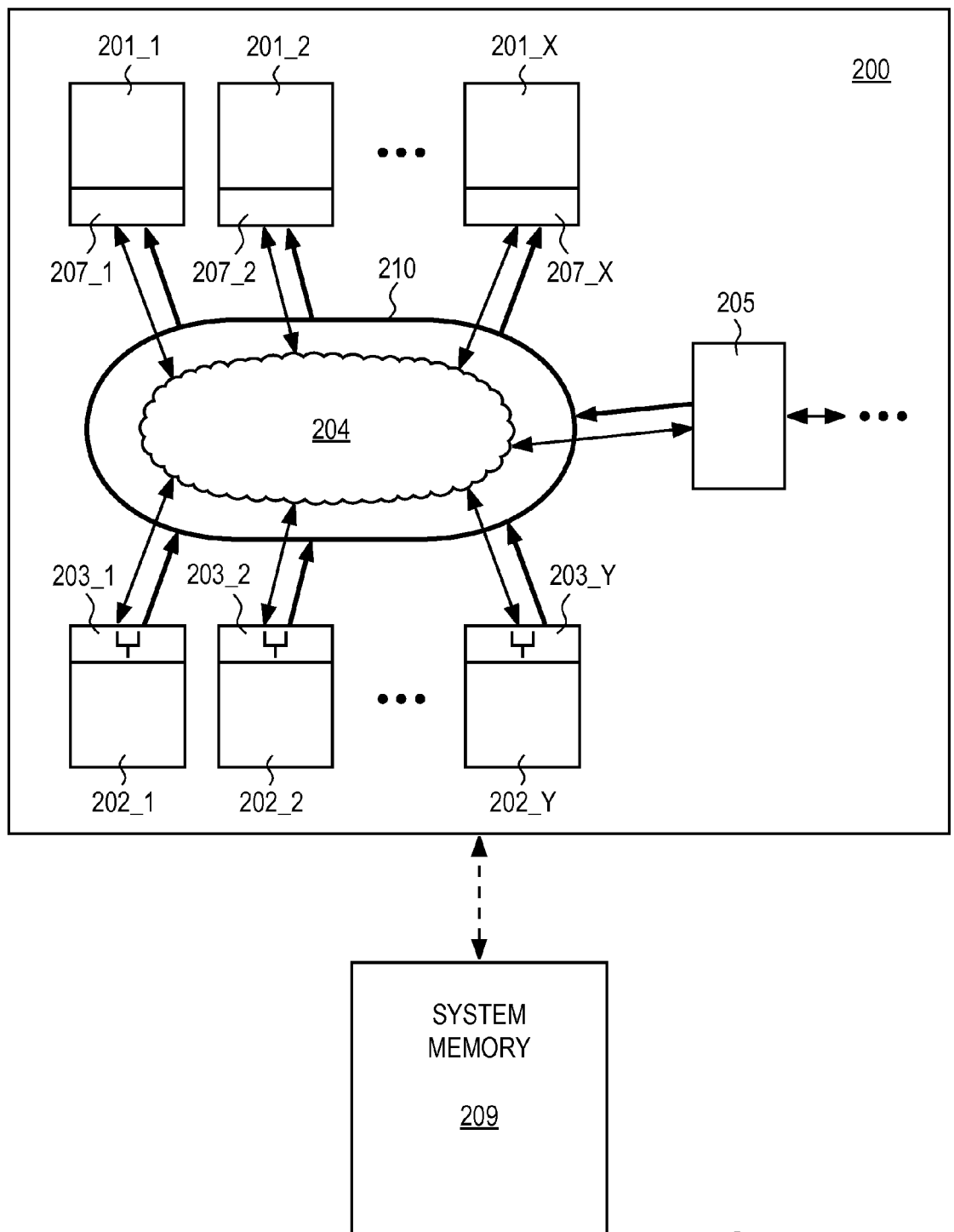
FIG. 2 shows features of a multi-processor computing system having the ability to substantially immediately communicate a warning from a cache agent to the processors.

FIG. 2 shows an improved approach which shows specially reserved communication resources between the cache agents 203_1 to 203_Y and the processors 201_1 to 201_X for communicating that the capacity of a cache agent to accept a new request no longer exists or has reached a low threshold. Because networking bandwidth is specially reserved for this type of communication, when a cache agent recognizes that one of its buffers is at/near full usage, it can send a warning to the processors substantially immediately, and, the processors will receive the warning substantially immediately. As such, corrective action by the processors to eliminate or drastically reduce their submission to network 204 of new requests for un-credited transactions can take effect substantially immediately after a cache agent's buffer becomes full or near full.

In the particular embodiment of FIG. 2, the specially reserved communication resources takes the form of a ring 210 between the processors 201_1 through 201_X and cache agents 203_1 to 203_Y that is separate and distinct from the network 204 that transports credited and credited traffic between the processors and cache agents. For instance, according to one embodiment where network 204 is implemented as a ring, ring 210 is a separate and distinct network from network/ring 204. According to another approach, some more integration may be undertaken. For instance, ring 210 may not exist as shown, and instead, a special time slot is reserved on the ring of network 204 for communicating the buffer full/near full condition.

According to another approach, at each cache agent, dedicated point-to-point links run to every processor for the purpose of sending a warning message to the processors, apart from other networking lines used to implement network 204. In another more integrated approach, network 204 is a mesh network or multi-hop network designed to immediately permit a number of warnings (e.g., up to XY warnings, or, less than XY warnings) to pass from the cache agents up to the processors. In this case the specially reserved communication resources may take the form of communication capacity that is left unused in network 204 except for such warnings should they arise, or, functionality to drop existing connections/traffic through the network in favor of transporting the warnings. Any number of other networking schemes may be employed to effect fast transfer of warning messages from one or more of the cache agents 203_1 to 203_Y to the processors 201_1 to 201_X.

Figure 3A:
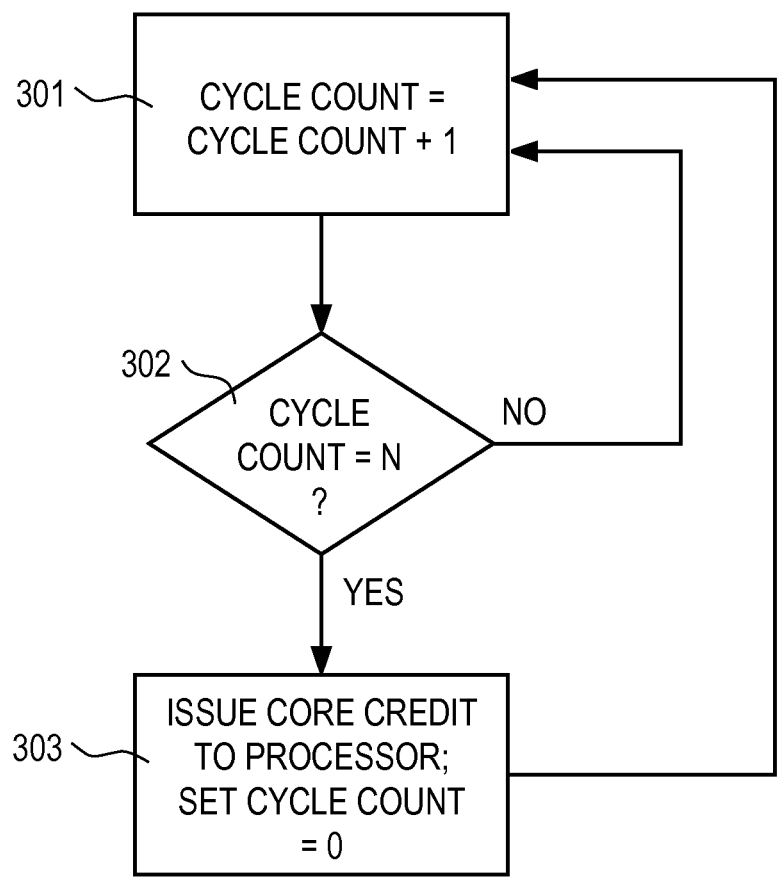
FIG. 3a shows a first method of operation for the interfaces of the processors of FIG. 2 to the cache agents of FIG. 2.
Figure 3B:
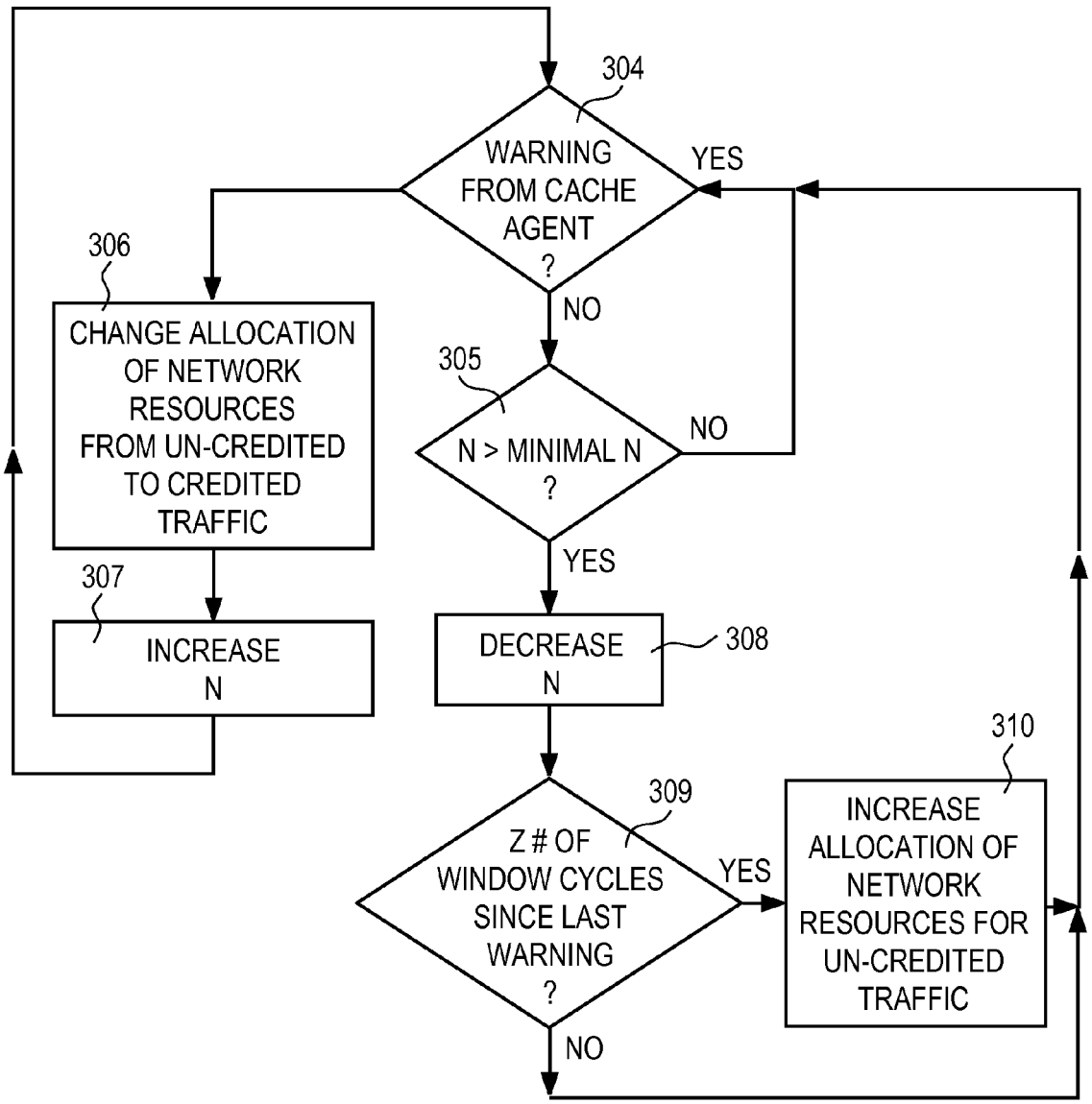
FIG. 3b shows a second method of operation for the interfaces of the processors of FIG. 2 to the cache agents of FIG. 2.

FIGS. 3a and 3b show processes demonstrating the operation of the network interfaces 207_1 to 207_X during normal conditions (FIG. 3a) and in response to a warning from one or more cache agents (FIG. 3b). Referring to FIG. 3a, as is known in the art, a system such as an individual processor or entire socket executes over a series of "cycles", where, each cycle typically is measured as one or more specific clock cycles or work cycles. According to normal operation, a parameter N is set to a specific integer quantity (referred to as "minimal N") and a cycle counter is incremented with each cycle 301. When the cycle counter reaches a value of N 302, the network interface releases a core credit (which is to be distinguished from credited and un-credited traffic flows) to its associated processor and resets the cycle counter 303.

Here, a processor must have a sufficient amount of core credit before it is permitted to issue any traffic, whether the traffic is associated with a credited transaction or an un-credited transaction. Thus, under normal operation, the counter repeatedly reaches N and is reset, and, the processor repeatedly receives and accumulates core credit. Over time the processor typically issues both credited and non credited traffic to the network 204 as it sees fit in proportion to the core credit that it has received from the network interface. Here, it is worthwhile to note that a processor can issue credited traffic into the network in cases where the transaction involves some kind of response by the processor to a previously issued request (e.g., from another processor), or, in other more complex cases than the simple case of a cache line request discussed at length above.

FIG. 3b shows a process that is executed concurrently with the process of FIG. 3a that, as described below, affects the issuance of un-credited and credited traffic onto network of 204. According to one implementation, the process of FIG. 3b operates with a periodicity (WINDOW) that is longer than a cycle (e.g., each WINDOW corresponds to a number of cycles). Thus, typically, the network interface will iterate through the process of FIG. 3a faster than the process of FIG. 3b. If under normal operation the network interface receives a warning from a cache agent, the answer to inquiry 304 is "yes" and the network interface: i) throttles down (decreases the rate of) its issuance of un-credited traffic 306 to the network 204; and, ii) increases the value of N 307. With respect to i) above, from a system level perspective, a drop in the issuance of un credited traffic to the network 204 corresponds to a change in devotion of the network's resources from un credited to credited traffic.

With respect to ii) above, increasing the value of N has the effect of slowing down the rate at which the processor will accumulate core credit, thus, slowing down the rate at which the processor will issue traffic (both credited and un-credited) to the network overall. Various embodiments for increasing the value of N and for throttling down the rate at which un-credited traffic is passed to the network 204 are discussed further below. Once network resources have been allocated from un credited to credit traffic 306 and N has been increased, inquiry 304 is asked again on the next WINDOW cycle.

So long as a cache agent is issuing a warning the answer to inquiry 304 will be "yes". The exact nature of process blocs 306 and 307 may vary from embodiment. For example, according to one embodiment, step 306 is performed only after the initial warning (i.e., after the answer to inquiry 304 changes from "no" to "yes"), and, moreover, the change of allocation of resources is substantial.

For example, recall the implementation described above where a first percentage of the resources of the network 204 are reserved for traffic of any kind (including credited traffic, un credited traffic and traffic that is not labeled as credited nor labeled as un-credited), and, a second percentage of the resources of the network are reserved for traffic that is labeled as credited or is labeled as un-credited. In an embodiment, the change in allocation of network sources at step 306 is affected only after the initial warning, and, the change in allocation is implemented by not permitting the network interface to use any of the first percentage for un credited traffic. Recalling a further embodiment, where the first percentage is approximately 45% and the second percentage is approximately 45%, such a step will remove 45% of the network's resources from servicing un credited traffic.

In alternative implementations the removal of network resources from servicing un credited traffic may be more gradual over a number of cycles rather than in a single cycle. FIG. 3b suggests that so long as there is a warning from a cache agent an allocation change in network resources 306 will take place every WINDOW cycle. Although this is a possible implementation there are also other possible implementations where such an allocation is made over only the first "X" WINDOW cycles after the warning and/or one or more allocation changes are dispersed between one or more WINDOW cycles in which no allocation is made, etc. FIG. 3b also suggests that so long as there is a warning from a cache agent N will be increased 307 every WINDOW cycle. However, in various implementations there may be an ultimate limit beyond which N will not increase, and/or, N may be increased, for example, between one or more WINDOW cycles in which no increase is made, etc.

Once the warnings from the cache agents disappear on the start of a new WINDOW cycle, the answer to inquiry 304 is "no" and the answer to inquiry 305 will be "yes" (because N presumably increased after the warning(s)). Upon the answer to inquiry 305 being "yes", N is decreased 308. With N being decreased an inquiry is also made to see if no new warnings have arisen within the last Z WINDOW cycles 309. In many situations the answer to inquiry 309 will be "no" initially after the warnings disappear. As such, N will continue to be decreased 308 on subsequent WINDOW cycles (with no new warnings) without the answer to inquiry 309 being "yes".

With no new warnings, eventually the answer to inquiry 309 will be "yes" which permits the network resources that were removed from servicing un credited traffic at step 306 to be useable again for un credited traffic 310. Again, different embodiments may exist for effecting the reallocation. For instance, all the resources that were taken away may be restored in a single WINDOW cycle, or over a number of WINDOW cycles (consecutive or dispersed between WINDOW cycles in which no re allocation takes place). In another approach, for step 309, rather than ask if a specific number of WINDOW cycles have passed without a new warning from a cache agent, instead, the question is asked if N has fallen below a threshold. If so, step 310 is permitted to commence. Conceivably step 310 could be gated on the occurrence of both N dropping below a threshold and a specific number of WINDOW cycles having passed without a new warning.

According to one specific embodiment, the manner in which N increases at step 307 is also a function of N. For example, if N is below an acceleration threshold, the value of N increases by 1 (or some other fixed amount) with each passing cycle. However, if N is above the acceleration threshold, N is incremented by $N/(2^Q)$ where Q is a constant. If $N/(2^Q)$ is less than a value of 1, then N is incremented by 1. If $N/(2^Q)$ is greater than a maximum permissible increment, N is incremented by the maximum permissible increment. Under typical circumstances, $N/(2^Q)$ is greater than 1. Thus adjusting N as described above corresponds to linearly increasing N (by 1 or some other fixed amount) until N reaches the acceleration threshold at which point increases non-linearly at a rate that is faster than the linear rate. This adjustment mechanism is suited for a situation where linear increases in N are insufficient to eliminate cache agent warnings, so N is increased more aggressively once the acceleration threshold is reached.

According to a same or different embodiment, the manner in which N is decreased at step 308 is configured to effect load balancing amongst the processing cores 201_1 through 201_X. Specifically, recall that, in an embodiment, each of the respective network interfaces 207_1 through 207_X for each of processors 201_1 through 201_X simultaneously perform a methodology to control the issuance of traffic onto network 204 (such as the methodologies observed in FIGS. 3a and 3b) contemporaneously with one another. Here, although it is possible that the value of N may track identically amongst the X interfaces as it is adjusted within each interface, it is also possible that discrepancies in the value of N may exist from interface to interface as N is increased (e.g., because of skew amongst the WINDOW cycles).

When the cache agents finally cease issuing warnings, step 308 of FIG. 3b may be designed to synchronize the value of N so that it is equal amongst the interfaces as N is being lowered. Specifically, according to one approach, N is lowered to the next lower power of 2. For instance if N is 65, N is first lowered to 64, then to 32, then to 16, then to 8, etc. Here, as the value of N should generally track pretty close from interface to interface, lowering N by respectable amounts across the interfaces by the same formula should cause N to be equal amongst the cache agents after relatively few decrement steps.

The processes discussed above may be implemented with dedicated electronic logic circuitry, program code that is executed on a processing core of some kind (such as an embedded controller) or a combination of the two.

Processes taught by the discussion above may be performed with program code such as machine-executable instructions that cause a machine such as a semiconductor processing core or microcontroller or other body of electronic circuitry having an instruction execution core of some kind that executes these instructions to perform certain functions. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus comprising:
a plurality of processors;
a plurality of cache slices and respective cache agents, each of said cache agents having a buffer to store requests from said processors;
a network between said processors and said cache slices to carry traffic of transactions that invoke said processors and said cache agents; and
communication resources between said processors and said cache agents reserved to transport one or more warnings from one or more of said cache agents to said processors that said one or more cache agents' respective buffers have reached a storage capacity threshold, wherein each of said processors has an interface coupled to said communication resources, said interface having electronic circuitry to reduce issuance of un-credited traffic by its respective processor in response to reception of said one or more warnings.

2. The apparatus of claim 1 wherein said processors, said cache slices, said cache agents, said network and said communication resources are all on a same semiconductor chip.

3. The apparatus of claim 1 wherein said network is implemented with a ring architecture.

4. The apparatus of claim 1 wherein said communication resources are implemented with a ring architecture.

5. The apparatus of claim 1 wherein said electronic circuitry is also to reduce issuance of credited traffic by its respective processor in response to reception of said one or more warnings.

6. The apparatus of claim 1 wherein the electronic circuitry is to reduce issuance of traffic on the network by its respective processor in response to reception of the one or more warnings.

7. The apparatus of claim 1 wherein the electronic circuitry is to eliminate issuance of traffic on the network by its respective processor in response to reception of the one or more warnings.

8. The apparatus of claim 1 wherein the communication resources are a separate network from the network between the processors and the cache slices.

9. A computing system comprising:
a plurality of processors, each of said processors having its own local cache;
a plurality of cache slices and respective cache agents, each of said cache agents having a buffer to store requests from said processors;
a network between said processors and said cache slices to carry traffic of transactions that invoke at least one of said processors and said cache agents; and
communication resources between said processors and said cache agents reserved to transport one or more warnings from one or more of said cache agents to said processors that said one or more cache agents' respective buffers have reached a storage capacity threshold, wherein each of said processors has an interface coupled to said communication resources, said interface having electronic circuitry to reduce issuance of un-credited traffic by its respective processor in response to reception of said one or more warnings.

10. The computing system of claim 9 wherein said processors, said cache slices, said cache agents, said network and said communication resources are all on a same semiconductor chip.

11. The computing system of claim 9 wherein said network is implemented with a ring architecture.

12. The computing system of claim 9 wherein said communication resources are implemented with a ring architecture.

13. The computing system of claim 9 wherein said electronic circuitry is also to reduce issuance of credited traffic by its respective processor in response to reception of said one or more warnings.

14. The computing system of claim 9 wherein the electronic circuitry is to reduce issuance of traffic on the network by its respective processor in response to reception of the one or more warnings.

15. The computing system of claim 9 wherein the electronic circuitry is to eliminate issuance of traffic on the network by its respective processor in response to reception of the one or more warnings.

16. The computing system of claim 9 wherein the communication resources are a separate network from the network between the processors and the cache slices.

17. An apparatus comprising:
a plurality of processors;
a plurality of cache slices and respective cache agents having a buffer to store requests from said processors;
a network between said processors and said cache slices to carry traffic of transactions that invoke at least one of said processors and said cache slices; and
communication resources between said processors and said cache agents reserved to transport one or more warnings from one or more of said cache agents to said processors that said one or more cache agents' respective buffers have reached a storage capacity threshold, wherein each of the processors has an interface coupled to said communication resources, said interface having electronic circuitry to reduce issuance of traffic by its respective processor in response to reception of said one or more warnings.

18. The apparatus of claim 17 wherein the electronic circuitry is to eliminate issuance of traffic on the network by its respective processor in response to reception of the one or more warnings.

19. The apparatus of claim 17 wherein said communication resources are implemented with a ring architecture.

20. The apparatus of claim 17 wherein the communication resources are a separate network from the network between the processors and the cache slices.

* * * * *